Feb. 8, 1955     S. P. McKINNEY     2,701,589
LOOP-FORMING TOOL
Filed June 14, 1952
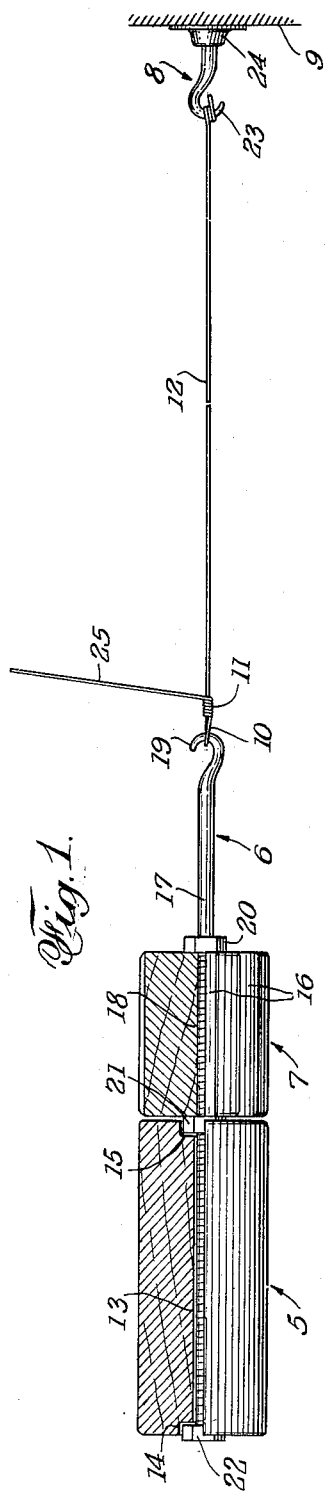
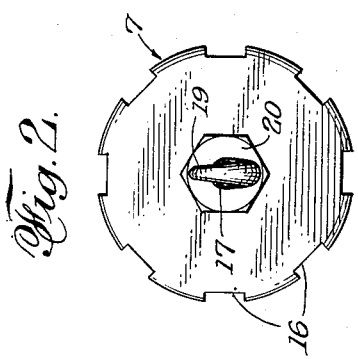
Inventor
STEPHEN P. McKINNEY
By C. G. Stratton
Attorney

United States Patent Office 2,701,589
Patented Feb. 8, 1955

2,701,589

LOOP-FORMING TOOL

Stephen P. McKinney, Los Angeles, Calif.

Application June 14, 1952, Serial No. 293,619

1 Claim. (Cl. 140—102.5)

This invention relates to a tool for forming a loop or eye on the end of a wire, the same being particularly adapted to form a loop on the end of a wire leader to connect to a fishline or to a hook, as the case may be.

This invention is characterized by the simplicity, ease and facility with which a thin wire can be provided with a loop or eye at one or both ends, and it is an object of the invention to provide a simple and inexpensive tool for this purpose.

Another object of the invention is to provide a tool, as indicated that, only by hand manipulation and without the aid of machinery, forms a loop or eye on the end of a wire.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes one embodiment of the present invention, which is given by way of illustration or example only.

In the drawing, like reference characters designate similar parts in the several views.

Fig. 1 is a side elevational view, in quarter section, of the present tool in operative position.

Fig. 2 is an enlarged end view of the wire-connecting end of said tool.

The tool that is illustrated comprises, generally, a handle 5 adapted to be gripped against the palm of the hand, a hook member 6 revolubly carried by said handle and extending axially beyond one end thereof, and a finger-piece 7 affixed to said hook member and adapted to be rotated relative to handle 5 by the fingers of the hand gripping said handle to, thereby, rotate the hook member while said handle is gripped. The tool above generally described is used in combination with a swivel hook 8 affixed to any suitable support 9 to form an eye 10, held by wrappings or convolutions 11, on a wire 12.

The handle 5 and finger-piece 7 are preferably formed of wood or of a plastic material of which phenolic resin is an example. Hook member 6 is preferably made of metal.

Handle 5 is preferably of cylindrical outer form, is provided with an axial bore 13 in the ends of which are formed counterbores 14 and 15. While shown with a smooth outer cylindrical face, said handle may be knurled if desired. In any case, said handle is proportioned to be comfortably, and without slippage, gripped against the palm of the hand as by the middle, ring, and little fingers, with the end thereof directed toward finger-piece 7.

The finger-piece 7 is also cylindrical and preferably somewhat shorter than handle 5 and is adapted to be rotated by the thumb and index finger of the hand which grips said handle. The cylindrical outer face of finger-piece 7 is provided with flutes 16 or comparable non-slippage means to facilitate manipulation by the fingers.

The hook member 6 comprises an elongated shank 17 that extends through bore 13 of the handle in which it is freely fitted, through a smaller bore 18 in the finger-piece in which it is tightly fitted, and beyond the end of said finger-piece. The outer end of hook member 6 is provided with an open hook 19. That portion of shank 17 which extends through the handle 5 and finger-piece 7 is provided with a screw thread as shown. A nut 20 on said shank against one end of the finger-piece and a nut 21 on said shank against the opposite end, combine to lock the finger-piece tightly on the shank so that said hook member is fixedly connected to the finger-piece.

Nut 21 resides in counterbore 15 of the handle and a nut 22 on the threaded end of shank 17 resides in counterbore 14. The latter nut is so adjusted as to leave limited end play of the handle whereby the latter and the hook member are relatively freely rotatable.

It will be obvious from the foregoing that the tool may be grasped and manipulated in the manner suggested to rotate hook 19.

The above-described tool is used in combination with swivel hook 8 in which the hook element 23 freely revolves or rotates in a base member 24 that is fastened to support 9.

In use, one end of wire 12 is connected to hook element 23 in any suitable manner. If there is an eye or loop on said end, the same is simply hooked on. The opposite end of said wire is then looped over hook 19, allowing a free end 25 of wire of substantial length, so that the same may be comfortably grasped. Now, with the tool held in one hand, as described, and said wire end 25 held in the other hand, finger-piece 7 is rotated to form wrappings or convolutions 11 at the end of the loop or eye 10 engaged with hook 19. Since the hook element 23 of swivel 8 is free to turn, wire 12 simply turns to cause such convolutions to form. Any remaining extension of end 25 is then cut off close to the convolutions 11 and the loop or eye is completed.

While the invention that has been illustrated and described is now regarded as the preferred embodiment, the construction is, of course, subject to modification without departing from the spirit and scope of the invention. It is, therefore, not desired to restrict the invention to the particular form of construction illustrated and described, but to cover all modifications that may fall within the scope of the appended claim.

Having thus described my invention, what I claim and desire to secure by Letters Patent is:

A wire-looping tool comprising a cylindrical handle having an axial bore, a finger-engageable and generally cylindrical member disposed in aligned end-to-end relation to said handle, a shank freely revoluble in said bore and extending through and beyond and affixed to the finger-engageable member, said shank having a hook on the extending end thereof, that portion of the shank that extends through the aligned handle and member being provided with a continuous thread, a nut on said thread against each end of the member to lock the member on the shank, and a nut on the threaded end of the shank to retain the handle thereon.

References Cited in the file of this patent

UNITED STATES PATENTS

| | | |
|---|---|---|
| 431,222 | Yeoman | July 1, 1890 |
| 647,401 | Gold | Apr. 10, 1900 |
| 667,854 | Tate | Feb. 12, 1901 |
| 682,604 | Dickey | Sept. 17, 1901 |
| 1,151,639 | Whitworth | Aug. 31, 1915 |
| 1,752,726 | Brannaka | Apr. 1, 1930 |
| 2,438,984 | Adams | Apr. 6, 1948 |
| 2,564,356 | Dianda | Aug. 14, 1951 |

FOREIGN PATENTS

| | | |
|---|---|---|
| 183,176 | Germany | Apr. 3, 1907 |